United States Patent [19]

Iwatani et al.

[11] Patent Number: 5,497,071
[45] Date of Patent: Mar. 5, 1996

[54] OUTPUT POWER CONTROL DEVICE FOR AUTOMOTIVE AC GENERATOR

[75] Inventors: Shirou Iwatani; Katsuhiko Kusumoto; Keiichi Komurasaki, all of Himeji, Japan

[73] Assignee: Mitsubishi Denki Kabushiki Kaisha, Tokyo, Japan

[21] Appl. No.: 214,544

[22] Filed: Mar. 18, 1994

[30] Foreign Application Priority Data

Mar. 23, 1993 [JP] Japan ................................. 5-064245
Dec. 28, 1993 [JP] Japan ................................. 5-338075

[51] Int. Cl.$^6$ ................................................ H02J 7/16
[52] U.S. Cl. ........................................ 322/28; 322/29
[58] Field of Search ................................. 322/28, 29

[56] References Cited

U.S. PATENT DOCUMENTS

| | | | |
|---|---|---|---|
| 4,451,776 | 5/1984 | Iwaki et al. | 322/22 |
| 4,739,245 | 4/1988 | Komurasaki et al. | 322/99 |
| 4,914,374 | 4/1990 | Iwatani et al. | 322/28 |
| 5,157,321 | 10/1992 | Kato et al. | 322/28 |
| 5,254,935 | 10/1993 | Vercesi et al. | 322/29 |

FOREIGN PATENT DOCUMENTS

106400  7/1982  Japan.

*Primary Examiner*—Steven L. Stephan
*Assistant Examiner*—Nicholas Ponomarenko
*Attorney, Agent, or Firm*—Sughrue, Mion, Zinn, Macpeak & Seas

[57] ABSTRACT

An output power control device for an automotive AC generator includes a field current limiter circuit 9 for controlling the duty factor of the power transistor 305 coupled in series with the field coil 102A of the AC generator 1A, which is supplied with a maximum field current twice the conventional level. A frequency-to-voltage converter 903 converts the input frequency to a voltage corresponding to the rpm of the AC generator 1A, and a comparator 909 compares the sawtooth waveform generated by a sawtooth waveform generator 908 with the output of the frequency-to-voltage converter 903, the upper level of which is limited under a predetermined level by resistors 904 through 906 and a diode 907. When the rpm of the AC generator 1A exceeds a predetermined frequency, the pulse train generated by the comparator 909 reduces the duty factor of the power transistor 305, thereby controlling the level of the output current generated by the AC generator 1A.

12 Claims, 11 Drawing Sheets

FIG. IIA

FIG. IIB

FIG. IIC

OUTPUT POWER CONTROL DEVICE FOR AUTOMOTIVE AC GENERATOR

BACKGROUND OF THE INVENTION

This invention relates to output power control devices for automotive AC generators.

Figure 13:
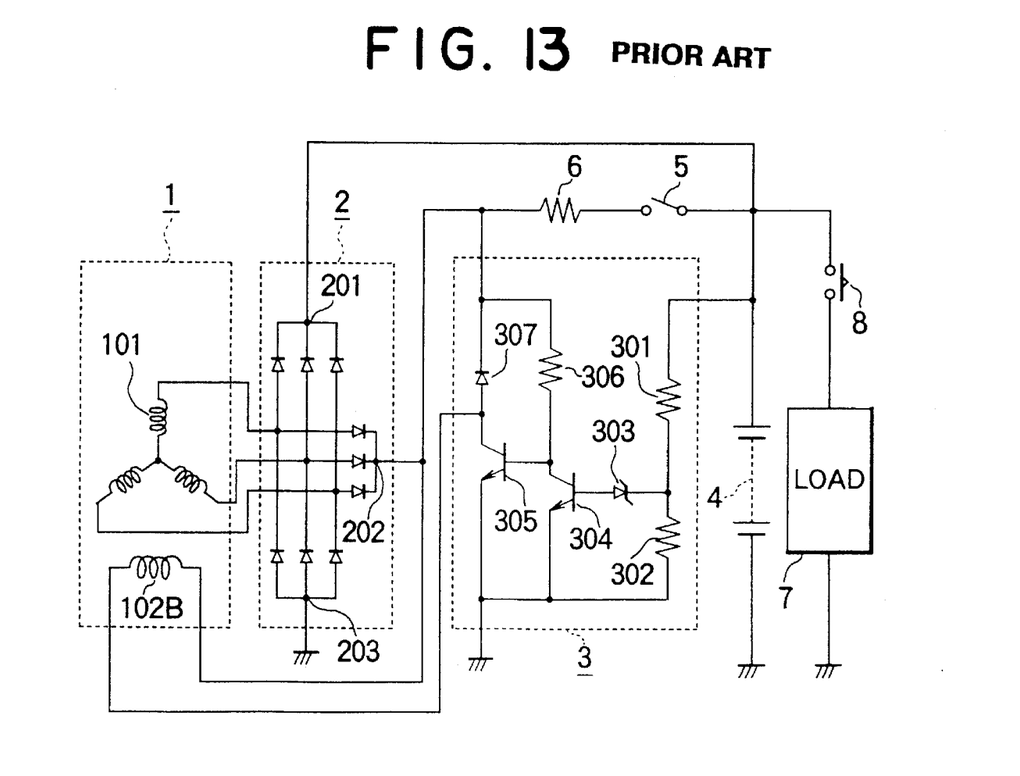
FIG. 13 is a circuit diagram showing a conventional output power control device for an automotive AC generator.

FIG. 13 is a circuit diagram showing a conventional output power control device for an automotive AC generator. A output power control device similar to that of FIG. 13 is disclosed, for example, in Japanese Utility Model Publication (Kokoku) No. 62-30480. In FIG. 13, the AC output of the AC generator 1 including the armature coil 101 and the field coil 102 is rectified by a full-wave rectifier 2 including a main output terminal 201, an auxiliary output terminal 202, and a grounded terminal 203. The output of the AC generator 1 is regulated to a predetermined voltage level by a voltage regulator circuit 3 including: voltage divider resistors 301 and 302 coupled in series, a Zener diode 303 coupled to the junction point between the resistors 301 and 302, a control transistor 304, a power transistor 305 for turning on and off the field current through the field coil 102, a resistor 306 and a surge absorber diode 307. The circuit of FIG. 13 further includes: a battery 4 charged by the AC generator 1, a key switch 5, and a resistor 6 for supplying the initial excitation current to the field coil 102. The current supply to the electric load 7 of the vehicle is controlled by a load switch 8.

The operation of the circuit of FIG. 13 is well known. Namely, when the key switch 5 is made before starting the engine, the base current for the power transistor 305 is supplied from the battery 4 through the key switch 5 and the resistors 6 and 306, and the power transistor 305 is turned on. As a result, the field current flows from the battery 4 through the key switch 5, the resistor 6, the field coil 102 and the power transistor 305 to the ground, and a magnetomotive force is generated by the field coil 102.

When the engine is started and the AC generator 1 is driven, an AC output is induced across the armature coil 101 corresponding to the rpm thereof and is rectified by the full-wave rectifier 2. When the output voltage of the full-wave rectifier 2 is below a predetermined level (e.g., 14.4 V), the voltage at the junction point between the resistors 301 and 302 is below the break down voltage of the Zener diode 303. The control transistor 304 is thus kept turned off. The power transistor 305 continues to be turned on and supply of the field current to the field coil 102 is maintained. The output voltage of the AC generator 1 thus rises as the rpm of the engine increases.

When the output voltage of the AC generator 1 rises above the predetermined level (14.4 V) as a result of the increase in the rpm thereof, the voltage between the resistors 301 and 302 rises to turn on the Zener diode 303 and supply the base current to the control transistor 304. The control transistor 304 is thus turned on, thereby grounding the base of the power transistor 305. As a result, the power transistor 305 is turned off, so as to interrupt the field current supplied to the field coil 102. The output voltage of the AC generator 1 thus falls. When the output voltage falls below the predetermined level, the Zener diode 303 and the control transistor 304 are again turned off, and the power transistor 305 is turned on. The field coil 102 is thus energized and the output of the AC generator 1 again rises.

Repeating the above operation, the output of the AC generator 1 is controlled to the predetermined level (14.4 V).

The battery 4 is thus charged to the predetermined voltage level.

Figure 2A:
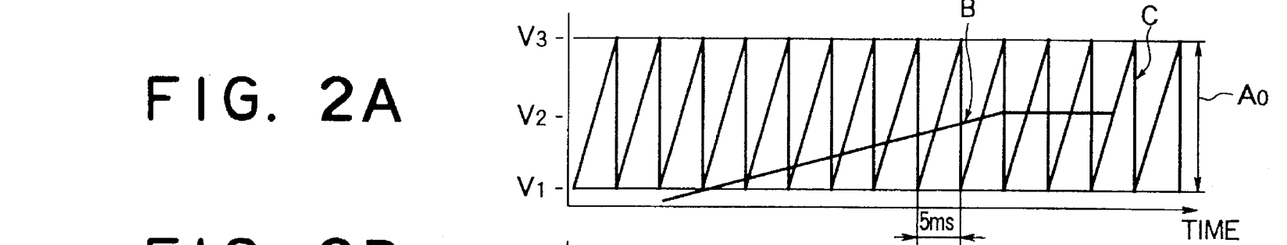
FIG. 2A shows the waveforms of the inputs to the (+)- and (−)-input terminals of the comparator 909 of FIG. 1.
Figure 2B:
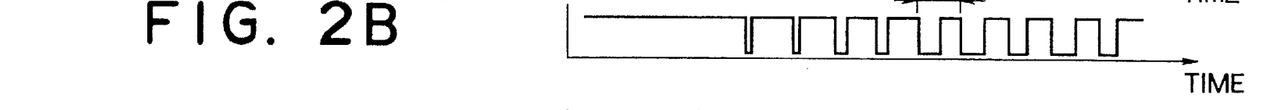
FIG. 2B shows the waveform of the output pulse train of the comparator 909 of FIG. 1.
Figure 2C:
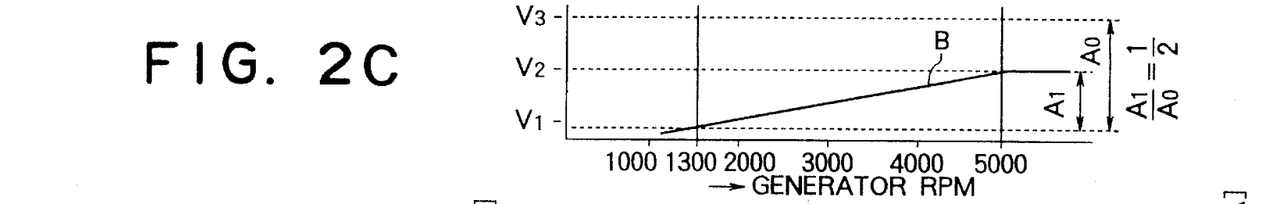
FIG. 2C shows the curve representing the variation of the voltage at point B in the circuit of FIG. 1 with respect to the rpm of the AC generator 1A.
Figure 2D:
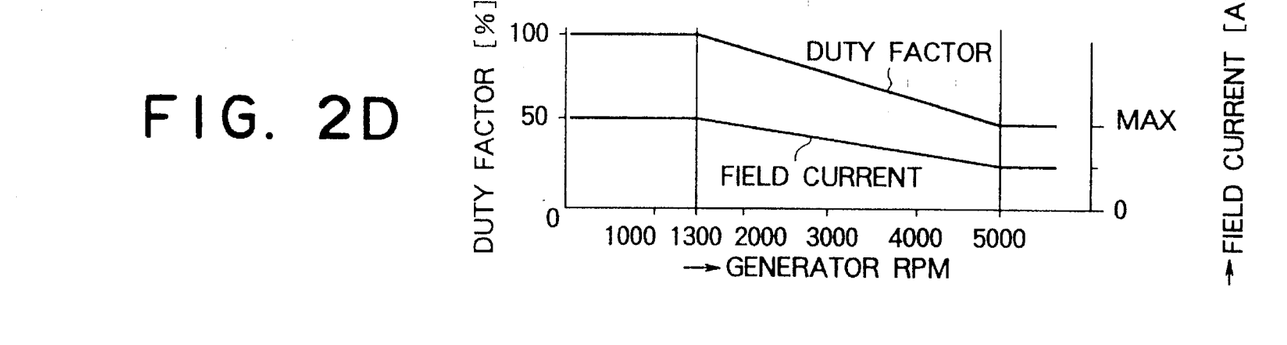
FIG. 2D shows the variation of the duty factor of the power transistor 305 and the variation of the field current with respect to the rpm of the AC generator 1A.
Figure 2E:
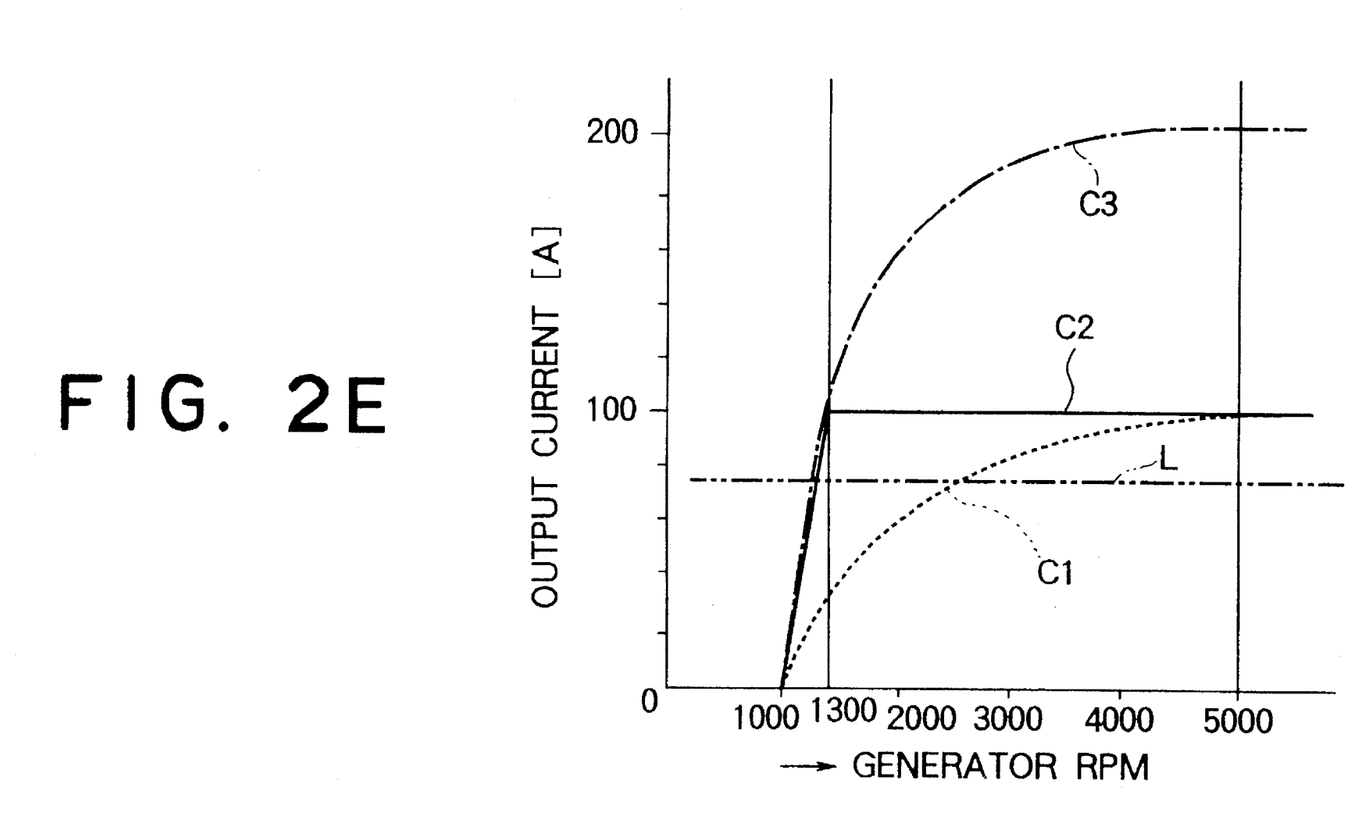
FIG. 2E shows the total load L of the vehicle, the maximum output current of the conventional AC generator (curve C1), the output current of the AC generator 1A of FIG. 1 as controlled by the field current limiter circuit 9 (curve C2), and the maximum output current of the AC generator 1A of FIG. 1 (curve C3)

As shown by the dotted curve C1 in FIG. 2E, the maximum output current that can be generated by the AC generator 1 increases as the rpm thereof increases, but is saturated at about 5000 rpm. Usually, the crossing point of the maximum output current (curve C1) with the total electric load of the vehicle (two-dots and chain curve L) is set about 2500 rpm.

The output power control device for an automotive AC generator thus has the following disadvantage. When the rotational speed of the AC generator 1 is less than 2500 rpm, the total load L of the vehicle is greater than the maximum output current C1 available from the AC generator 1. Thus, if, for example, the vehicle is trapped in a traffic jam and is forced to run continually for a prolonged time at a low speed at which the AC generator 1 is driven at less than 2500 rpm, the voltage level of the battery 4 tend to fall below the normal. In particular, during the night time when the headlights of the vehicle are turned on, or when the electric load of the vehicle is great, the battery may be over-discharged and the engine may be halted as a result.

SUMMARY OF THE INVENTION

It is therefore an object of this invention to provide an output power control device for an automotive AC generator which increases the output of the AC generator to prevent the battery charge shortage when the rpm of the AC generator is small, and decreases the AC output to improve the efficiency of the AC generator when the rpm of the AC generator exceeds the total electric load of the vehicle with some margin.

The above object is accomplished in accordance with the principle of this invention by an output power control device for an automotive AC generator including a field coil, the output power control device including: switching means coupled in series with a field coil of an automotive AC generator for controlling a current supplied to the field coil; rotational speed detector means for detecting a value corresponding to a rotational speed of the automotive AC generator; and field current control means, coupled to the rotational speed detector means, for reducing an effective level of the current supplied to the field coil when the rotational speed of the automotive AC generator exceeds a first predetermined rotational speed level; wherein a current output by the automotive AC generator exceeds a total electric load of a vehicle associated with the automotive AC generator when a rotational speed of the automotive AC generator is above a second predetermined rotational speed level lower than the first predetermined rotational speed level.

Preferably, the field current control means controls a duty factor of the switching means to reduce the effective level of the current supplied to the field coil when the rotational speed of the automotive AC generator exceeds the first predetermined rotational speed level. Further, it is preferred that the field current control means includes: converter means, coupled to the rotational speed detector means, for converting a level corresponding to the rotational speed of the automotive AC generator to a voltage corresponding thereto; and pulse width modulation means, coupled to the converter means, for generating a pulse signal of a varying duty factor, wherein the duty factor of the pulse signal is reduced when the rotational speed of the automotive AC generator exceeds the first predetermined rotational speed level; wherein an ON/OFF of the switching means is controlled by the pulse signal output from the pulse width modulation means to reduce the effective level of the current supplied to the field coil when the rotational speed of the automotive AC generator exceeds the first predetermined rotational speed level. The pulse width modulation means is preferred to include: sawtooth waveform generator for generating and outputting a sawtooth waveform signal of a predetermined frequency; a comparator having a first input terminal coupled to an output of the converter means, and a second input terminal coupled to an output of the sawtooth waveform generator, wherein the comparator compares the sawtooth waveform with the output of the converter means to generate the pulse signal of varying duty factor. It is further preferred that the pulse width modulation means further includes: voltage limiter means for limiting the output of the converter means under a predetermined level. The voltage limiter means may include: a voltage divider providing a predetermined constant voltage at a junction point therebetween; and a serial connection of a resistor and a diode coupled across the output of the converter means and the junction point between the resistors of the voltage divider.

Preferably, the first and second predetermined rotational speed are selected to include therebetween a range corresponding to an idling rotational speed of the engine associated with the automotive AC generator. The switching means may consist of a semiconductor switching element. The output power control device usually further includes: voltage regulator circuit means, coupled to an output of the automotive AC generator, for controlling an ON/OFF of the switching means in response to an output voltage level of the automotive AC generator.

Furthermore, the pulse width modulation means may include: a voltage divider providing a predetermined constant voltage at a junction point therebetween; first comparator means having a first input coupled to the junction point of the voltage divider, and a second input coupled to an output of the converter means, the first comparator means generating and outputting a signal at a first and a second level, respectively, according as the output of the converter means is above and below the predetermined constant voltage provided by the voltage divider; sawtooth waveform generator for generating and outputting a sawtooth waveform signal of a predetermined frequency; and second comparator means having a first input coupled to an output of the first comparator, and a second input coupled an output of the sawtooth waveform generator means, wherein the comparator compares the sawtooth waveform with the output of the first comparator to generate the pulse signal of varying duty factor. Then, the output power control device is preferred to further include: voltage change rate moderation means, having an input coupled to the output of the first comparator, and an output coupled to the first input of the comparator, wherein the voltage change rate moderation means moderates a change rate of the signal output from the converter means and applies a moderated signal to the first input of the second comparator means.

The voltage change rate moderation means may include: a capacitor coupled across the first input of the second comparator means and a constant voltage level; constant charging current source means, having a control input coupled to the output of the converter means, for charging the capacitor with a constant current when the output of the converter means changes from a first to a second level; and constant discharging current source means, having a control input coupled to the output of the converter means, for discharging the capacitor with a constant current when the output of the converter means changes from the second to the first level.

BRIEF DESCRIPTION OF THE DRAWINGS

The features which are believed to be characteristic of this invention are set forth with particularity in the appended claims. The structure and method of operation of this invention itself, however, will be best understood from the following detailed description, taken in conjunction with the accompanying drawings, in which:

In the drawings, like reference numerals represent like or corresponding parts or portions.

DETAILED DESCRIPTION OF THE PREFERRED EMBODIMENTS

Referring now to the accompanying drawings, the preferred embodiments of this invention are described.

Figure 1:
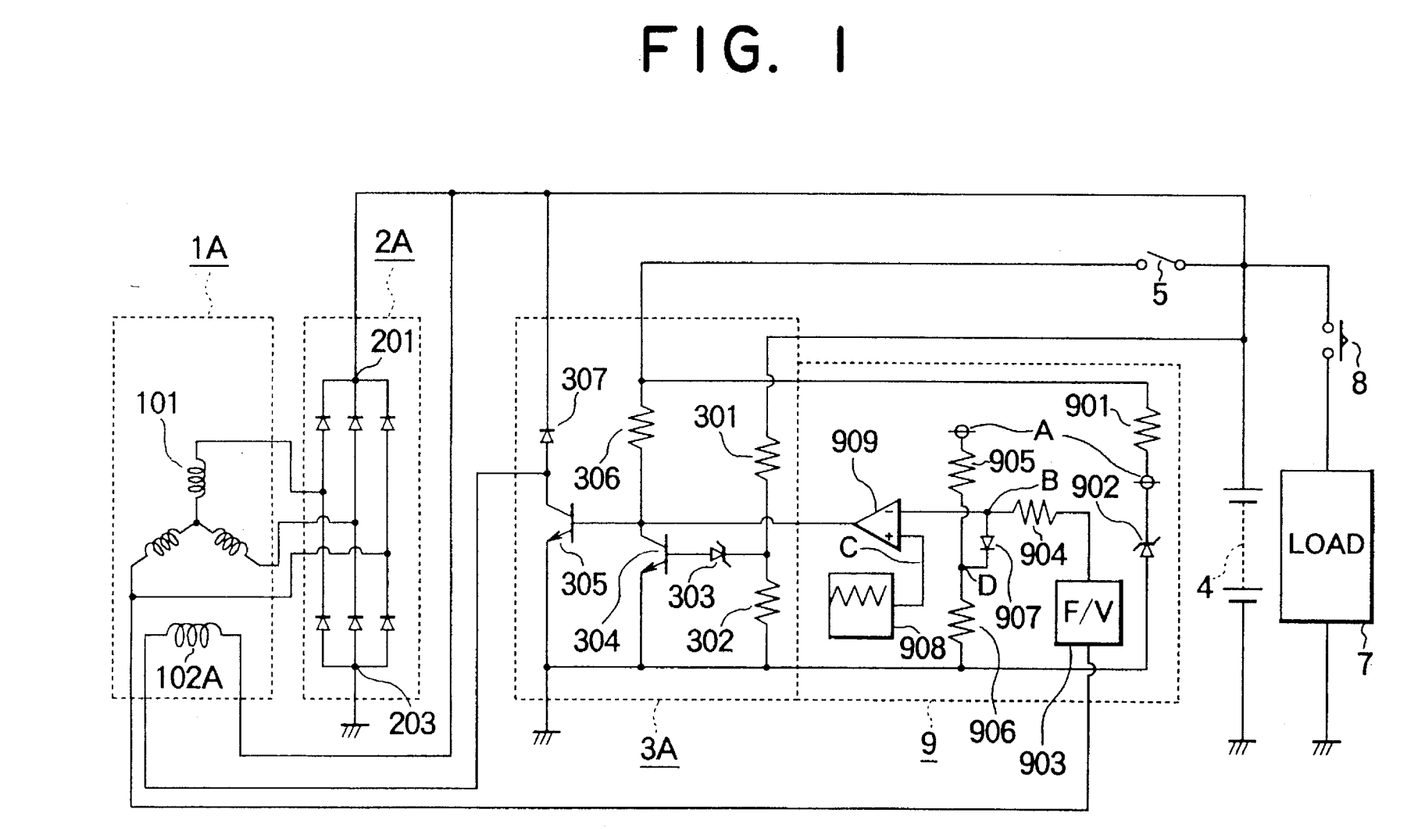
FIG. 1 is a circuit diagram showing an output power control device for an automotive AC generator according to this invention.

FIG. 1 is a circuit diagram showing an output power control device for an automotive AC generator according to this invention. The AC output of an AC generator 1A is rectified by a full-wave rectifier 2A and then is regulated to a predetermined voltage by a voltage regulator circuit 3A. As described below, the field current limiter circuit 9 reduces the effective field current by controlling the duty factor thereof and thereby controls the output current level of the AC generator 1A when the rpm of the AC generator 1A exceeds a predetermined level. The AC generator 1A, the full-wave rectifier 2A and the voltage regulator circuit 3A are similar to the AC generator 1, the full-wave rectifier 2 and the voltage regulator circuit 3 of FIG. 13. The battery 4, the key switch 5, the electric load 7 and the load switch 8 are the same as those of FIG. 13.

Thus, the AC generator 1A includes a three-phase armature coil 101 and a field coil 102A. However, the dimensional parameters of the field coil 102A of the AC generator 1A are selected such that the field current is at about 10 A at the normal battery voltage level, compared with the conventional level of about 5A. Thus, as shown in FIG. 2E, the maximum output current C3 of the AC generator 1A is about twice as great as the maximum output current C1 of the AC generator 1 of the conventional circuit.

The full-wave rectifier 2A includes six diodes coupled in a full-wave rectifier bridge circuit, with a main output terminal 201 and a grounded terminal 203 coupled across the battery 4. It is noted that, in contrast to the full-wave rectifier 2 of FIG. 13, the full-wave rectifier 2A does not includes an auxiliary output terminal 202.

The voltage regulator circuit 3A includes voltage divider resistors 301 and 302 coupled across the battery 4. The junction point between the resistors 301 and 302 is coupled through a Zener diode 303 to the base of a control transistor 304. The control transistor 304 is coupled across the battery 4 through a resistor 306 and a key switch 5. Further, the collector of the control transistor 304 is coupled to the base of the power transistor 305, which is coupled in series with the field coil 102A across the main output terminal 201 of the full-wave rectifier 2A and the ground. A surge absorber diode 307 is coupled across the collector of the power transistor 305 and the main output terminal 201 of the full-wave rectifier 2A so as to absorb the surge current. The field current through the field coil 102A is controlled by the ON/OFF of the power transistor 305 coupled in series therewith.

Curve C2 in FIG. 2E represents the output current level of the AC generator 1A with respect to the rpm thereof. The field current limiter circuit 9 controls the duty factor (the ON rate) of the power transistor 305 and thereby reduces the output current of the AC generator 1A when the rpm of the AC generator 1A exceeds a predetermined level. As described below, this is effected by generating a pulse train of varying duty factor (pulse-modulated signal) and applying it to the base of the power transistor 305.

The field current limiter circuit 9 includes a resistor 901 and a Zener diode 902 coupled serially across the battery 4 to provide a constant voltage source A at the junction point therebetween. Further, serially coupled resistors 905 and 906 constituting a voltage divider is coupled across the constant voltage source A and the ground, to provide a constant voltage at the junction point D. A frequency-to-voltage converter 903 having an input coupled to a phase of the armature coil 101 of the AC generator 1A converts the input frequency into a voltage corresponding thereto. The output voltage of the frequency-to-voltage converter 903 increases linearly as the rpm of the AC generator 1A or that of the engine driving the AC generator 1A increases. The output of the frequency-to-voltage converter 903 is coupled to the (−)-input terminal of a comparator 909 through a resistor 904 of a large resistance value. The resistances of the resistors 905 and 906 are about one hundredth (1/100) of the resistance of the resistor 904. The junction point B between the resistor 904 and the (−)-input terminal of the comparator 909 is coupled through a diode 907 to the junction point D between the resistors 905 and 906, the forward direction of the diode 907 being from point B toward point D. Thus, the circuit consisting of the resistors 904 through 906 and the diode 907 limits the voltage at the point B coupled directly to the (−)-input terminal of the comparator 909 under a predetermined level $V_2$ provided substantially at point D (see curve B in FIG. 2C). The (+)-input terminal of the comparator 909 is coupled to the output of a sawtooth waveform generator 908. The sawtooth waveform generator 908 generates a sawtooth waveform of a predetermined amplitude $A_0$ and a predetermined pulse repetition period (10 millisecond), the sawtooth waveform vibrating between the bottom voltage $V_1$ and the peak voltage $V_3$ around the central voltage level $V_2$ (see curve C in FIG. 2A). The bottom voltage $V_1$ is above the ground level. The comparator 909 compares voltages input to the (+)-and the (−)-input terminals thereof and outputs the result of the comparison. Thus, when the voltage at the (−)-input terminal exceeds the bottom level V1 input to the (+)-input terminal, the comparator 909 generates a pulse train at a pulse repetition period of 5 milliseconds, the duty factor of which decreases as the rpm of the AC generator 1A increases. Until the output of the frequency-to-voltage converter 903 exceeds the bottom voltage level $V_1$ of the sawtooth waveform output from the sawtooth waveform generator 908, the output of the comparator 909 is kept at the high level (see the waveform of the pulse signal of FIG. 2B). The output of the comparator 909 is coupled to the base of the power transistor 305. Thus the duty factor (the ON rate) of the power transistor 305 corresponds to the duty factor of the pulse signal output from the comparator 909, which is reduced from 100 percent when the rpm of the AC generator 1A exceeds a predetermined level (about 1300 rpm).

Next, the operation of the circuit of FIG. 1 is disclosed in detail.

When the key switch 5 is closed at the start of the engine, the current flows from the positive terminal of the battery 4 to the ground through the resistor 901 and the Zener diode 902, and the voltage at the constant voltage source A is set at a predetermined level. Thus, the voltage at the junction point D between the resistors 905 and 906 is set at a second predetermined voltage level substantially equal to $V_2$. At this time, the output of the frequency-to-voltage converter 903, which is proportional to the rpm of the AC generator 1A or that of the engine driving the AC generator 1A, is still at the ground level since the engine is not started yet. Thus, the voltage at the point B is at the ground level, and hence the voltage at the (−)-input terminal of the comparator 909 is less than the bottom voltage level $V_1$ of the sawtooth waveform generated by the sawtooth waveform generator 908. The output of the comparator 909 is thus retained at the high level.

Furthermore, the voltage at the junction point between the resistors 301 and 302 is less than the Zener break down voltage, of the Zener diode 303 and thus the Zener diode 303 and the control transistor 304 remains turned off. Thus, the base current of the power transistor 305 is supplied from the battery 4 through the key switch 5 and the resistor 306. As a result, the power transistor 305 is turned on with a duty factor of 100 percent, to supply the field current from the battery 4 to the field coil 102A therethrough. As mentioned above, the field current is about twice as great as the field current compared with the conventional case.

When the engine is started, the AC generator 1A is driven and the rpm thereof increases, thereby inducing an AC voltage across the armature coil 101. However, up to about 1000 rpm, the voltage induced across the armature coil 101 is smaller than the voltage across the battery 4, and hence the current is not output from the full-wave rectifier 2A (see curves C2 and C3 in FIG. 2E). When the rpm of the AC generator 1A exceeds about 1000 rpm, the voltage induced across the armature coil 101 exceeds the battery voltage and the output current from the full-wave rectifier 2A increases rapidly. The output voltage of the frequency-to-voltage converter 903 corresponding to the rpm of the AC generator 1A also increases. Up to about 1300 rpm, however, the output voltage of the frequency-to-voltage converter 903 is still less than the bottom voltage $V_1$ of the sawtooth waveform generated by the sawtooth waveform generator 908, and hence the power transistor 305 is kept turned on with a duty factor of 100 percent.

As the rpm of the AC generator 1A further increases, the output voltage of the frequency-to-voltage converter 903 and hence the voltage at point B coupled directly to the (−)-input terminal of the comparator 909 increases. As shown by curve B in FIG. 2C, the output voltage of the frequency-to-voltage converter 903 exceeds the bottom level $V_1$ of the sawtooth waveform output of the sawtooth waveform generator 908 when the rotational speed of the AC generator 1A exceeds about 1300 rpm. As shown in FIG. 2E, the maximum output current C3 that can be generated by the AC generator 1A (i.e., the output current that is generated if the field coil 102A is supplied with the field current at the duty factor of 100 percent) reaches the total electric load L of the vehicle at a rotational speed just below 1200 rpm. Thus, at 1300 rpm, the output current generated by the AC generator 1A is above the total electric load L of the vehicle by a predetermined margin. From about 1300 rpm and to about 5000 rpm, the voltage at point B increases linearly as the output of the frequency-to-voltage converter 903 increases. The output of the comparator 909 is at the high level when the level of sawtooth waveform C of the sawtooth waveform generator 908 is greater than the voltage B at the point B (see FIG. 2A). Thus, the duty factor of the pulse train output from the comparator 909 and hence that of the power transistor 305 decreases linearly as the rpm of the AC generator 1A increases (see the upper curve of FIG. 2D). Accordingly, the effective level (i.e., the time average) of field current supplied to the field coil 102A also decreases linearly from the maximum level thereof as the rpm of the AC generator 1A increases (see the lower curve of FIG. 2D)

The maximum output current that can be generated by the AC generator 1A increases as the rpm of the AC generator 1A increases, as shown by curve C3 in FIG. 2E. Above 1300 rpm, however, the field current is reduced as shown in FIG. 2D. As a result, the output of the AC generator 1A is held substantially at a constant level of about 100 A, as represented by curve C2 in FIG. 2E.

When the rotational speed of the AC generator 1A exceeds 5000 rpm, the output voltage of the frequency-to-voltage converter 903 becomes greater than the voltage $V_1$, provided at the junction point D between the resistors 905 and 906. Since the point B is coupled to the point D through the diode 907, the voltage at point B is limited under the voltage $V_2$ at point D. (For simplicity, the forward voltage drop across the diode 907 is ignored.) The voltage $V_2$ is set equal to $V_1 + A_1$, where $V_1$ represents the bottom level of the sawtooth waveform C and $A_1$ represents one half the amplitude $A_0$ thereof (see FIG. 2C). Thus, above 5000 rpm, the duty factor of the pulse train output from the comparator 909 is retained at 50 percent (see FIGS. 2A and 2B). Thus, the effective field current supplied to the field coil 102A is kept at about one half of the maximum field current level (see FIG. 2D). On the other hand, the maximum output current is saturated at about 5000 (see curve C3 in FIG. 2E). Consequently, the output current of the AC generator 1A remains substantially at the constant level of about 100 A (see curve C2 in FIG. 2E).

As described above, the duty factor of the power transistor 305 is controlled by the output of the comparator 909. On the other hand, the ON/OFF control of the power transistor 305 by means of the Zener diode 303 and the control transistor 304 is effected in the same way as in the conventional case, so as to control the output voltage level of the full-wave rectifier 2A. Thus, when the output voltage of the full-wave rectifier 2A does not exceed a predetermined level (e.g., 14.4 V), the voltage at the junction point between the resistors 301 and 302 remains sufficiently low to keep the Zener diode 303 turned off. The control transistor 304 thus remains turned off, thereby keeping the power transistor 305 turned on. The duty factor of the power transistor 305 is controlled by the output of the comparator 909 as described above. On the other hand, when the output voltage of the full-wave rectifier 2A exceeds the predetermined level (14.4 V), the Zener diode 303 is turned on. The control transistor 304 is thus turned on and the power transistor 305 is turned off. Repeating the ON/OFF control of the power transistor 305, the voltage regulator circuit 3A regulates the output voltage of the full-wave rectifier 2A to the predetermined level (14.4 V).

As described above, the output current C2 of the AC generator 1A exceeds the total load L at a rotational speed below 1200 rpm of the AC generator 1A, which is less than the typical rotational speed 1500 rpm of the AC generator 1A corresponding to the idling rpm of the engine. Thus even when the AC generator 1A is driven in the low rotational speed range of from 1000 to 2000 rpm corresponding to the idling rpm range of the engine, the shortage of the output current does not take place. Even when the vehicle is trapped in a traffic jam and the AC generator 1A is driven below 2500 rpm for a prolonged time, the shortage of the charge of the battery 4 and hence the over-discharge thereof and the resulting engine halt can effectively prevented.

Figure 3:
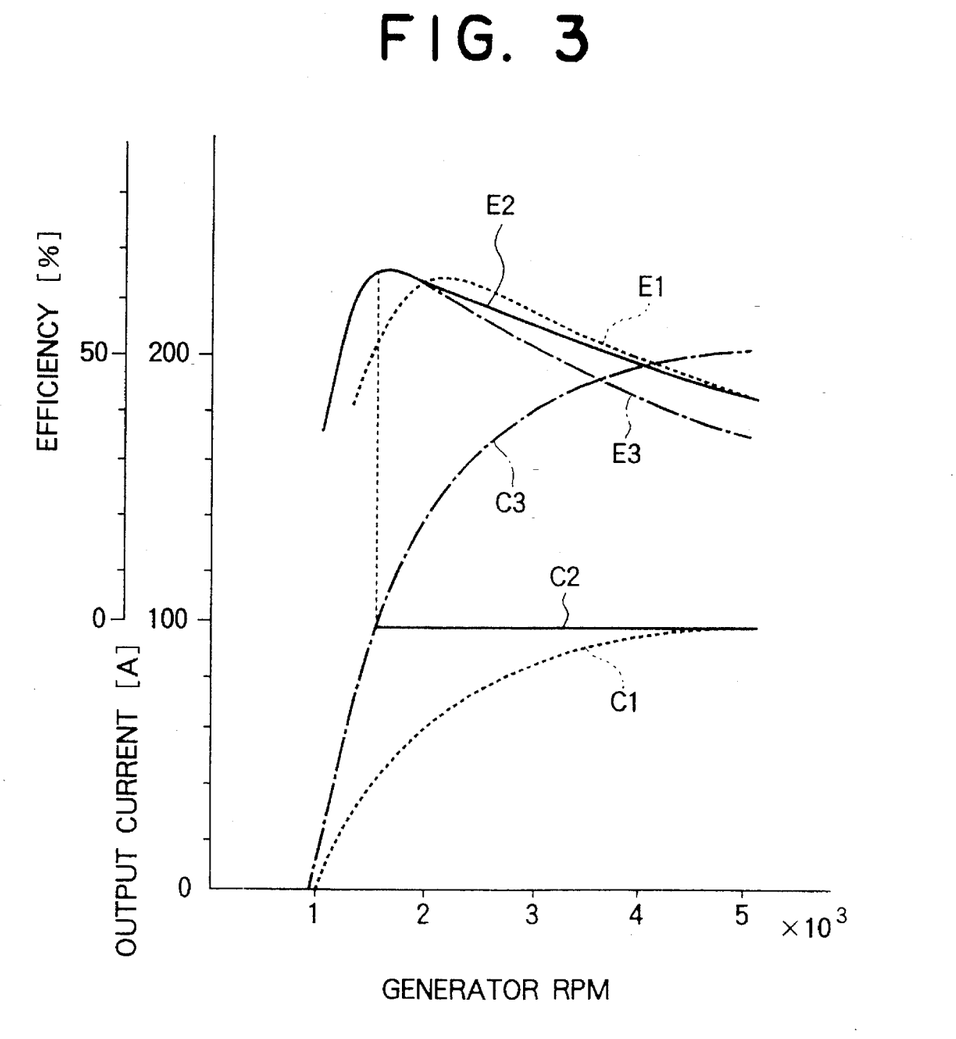
FIG. 3 shows the energy conversion efficiency curves E1, E2 and E3 of the AC generator together with the output current curves C1, C2 and C3 corresponding thereto.

On the other hand, when the rpm of the AC generator 1A exceeds about 1300 rpm, the output current is limited substantially under a constant level and the generation of unnecessary current is prevented. Thus, the energy conversion efficiency of the AC generator 1A is improved as shown in FIG. 3, where curves E1, E2 and E3 represent the efficiency of the AC generator corresponding to the output currents C1, C2 and C3. (The curves C1, C2 and C3 in FIG. 3 correspond to those shown in FIG. 2.)

Figure 4:
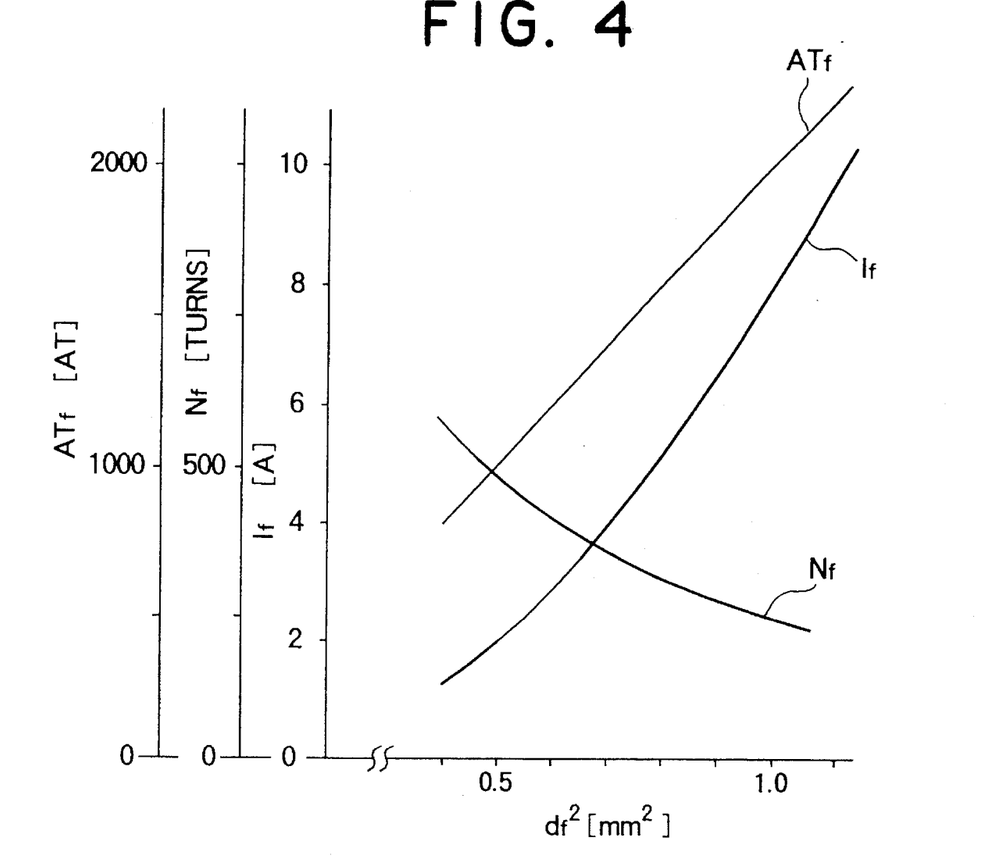
FIG. 4 shows the variation of the magnetomotive force $AT_f$ of the field coil, variation of the field current $I_f$, and the variation of the number of turns $N_f$ of the field coil, with respect to the square $d_f^2$ of the diameter $d_f$ of the wire constituting the field coil.

FIG. 4 shows the variation of the magnetomotive force $AT_f$ of the field coil, variation of the field current $I_f$, and the variation of the number of turns Nf of the field coil, with respect to the square $d_f^2$ of the diameter $d_f$ of the wire constituting the field coil. Assume that the space provided within the housing of the AC generator 1A for accommodating the field coil 102A is fixed. Then, as shown in FIG. 4, the number of turns $N_f$ of the field coil 102A decreases as the square $d_f^2$ of the diameter $d_f$ of the field coil 102A increases. The field current $I_f$, however, increases with the increase of the square $d_f^2$ of the diameter of the field coil 102A, and the magnetomotive force $AT_f$ (as measured in the unit of ampere turns) increases accordingly.

Figure 5:
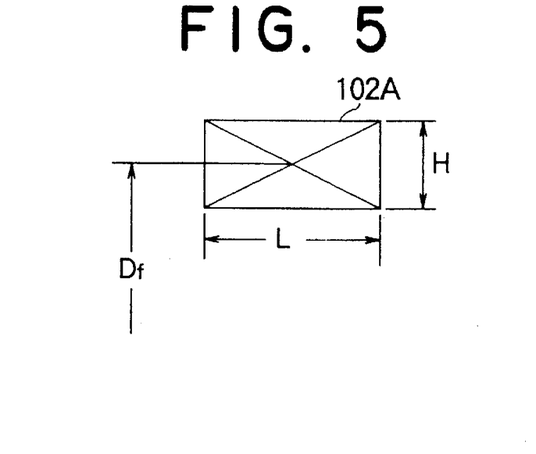
FIG. 5 is a schematic sectional view of the field coil, showing the principal dimensions thereof.

Next, referring to FIG. 5, the derivation of the relations shown in FIG. 4 is discussed. FIG. 5 is a schematic sectional view of the field coil, showing the principal dimensions thereof, wherein $D_f$ represents the average diameter of the field coil 102A, L represents the length of the field coil 102A in the axial direction thereof, and H represents the height of the field coil 102A in the radial direction thereof. It is here assumed that the space provided within the housing of the AC generator 1A for accommodating the field coil 102A is fixed. Then, the magnetomotive force ATf is given by:

$$AT_f = N_f I_f$$

Further, since the field current $I_f$ is given by:

$$I_f = V_f/R_f$$

where $V_f$ represents the voltage applied across the field coil and $R_f$ represents the resistance of the field coil. The resistance of the field coil $R_f$ is given by:

$$R_f = 4\rho \cdot m/(\pi \cdot d_f^2)$$

where m represents the length of the field coil and $\rho$ represents the resistivity of copper Cu of which the field coil is made. Furthermore, since length m of the field coil is:

$$m = \pi \cdot D_f N_f$$

the resistance $R_f$ of the field coil is given by:

$$R_f = \rho \cdot 4\pi \cdot D_f N_f/(\pi \cdot d_f^2)$$

Thus, the magnetomotive force ATf is equal to:

$$AT_f = N_f \cdot d_f^2 \cdot V_f/(4\rho \cdot D_f \cdot N_f)$$
$$= d_f^2 \cdot V_f/(4\rho \cdot D_f)$$

The magnetomotive force $AT_f$ is thus proportional to the square $d_f^2$ of the diameter of the field coil 102A. Since the number of turns $N_f$ of the field coil 102A is given by:

$$N_f = L \cdot H/(\alpha \cdot d_f) \cdot (\alpha \cdot d_f \sin 60°)$$

where $\alpha$ represents the coating factor of the wire constituting the field coil 102A, the number of turns Nf of the field coil 102A is proportional to $1/d_f^2$. Furthermore, since the field current If is calculated as:

$$I_f = V_f/R_f$$
$$= d_f^2 \cdot V_f/(4\rho \cdot D_f \cdot N_f)$$
$$= \alpha^2 \cdot d_f^4 \cdot \sin 60° \cdot V_f/(4\rho \cdot D_f \cdot L \cdot H)$$

the field current If is proportional to $d_f^4$.

It is noted that in the circuit of FIG. 1, the frequency of the pulse train output from the comparator 909 is equal to twice the frequency of the sawtooth waveform output from the sawtooth waveform generator 908, irrespective of the duty factor of the output of the comparator 909 (see FIGS. 2A and 2B). Selecting the optimum frequency of the sawtooth waveform output from the sawtooth waveform generator 908, the effective field current can be reduced stably by a factor corresponding to the duty factor of the output of the comparator 909, without incurring the fluctuation of the output voltage level of the field coil 102A. The frequency of the pulse train output from the comparator 909 is preferred to be above 20 KHz, since the flickering of the lamps may be observed when the frequency is below that level.

The circuit of FIG. 1 further has the advantage that the device is made compact since the rpm of the AC generator 1A itself rather than that of the engine is detected within the AC generator 1A, in order to control the duty factor of the field current supplied to the field coil 102A. However, for the purpose of reducing the production cost, the rpm of the engine detected by the built-in rpm detector thereof may be supplied to the frequency-to-voltage converter 903. Then, assuming that the pulley ratio of the AC generator 1A with respect to the engine is from about 2 to 2.5, the duty factor of the field current is to be reduced when the rpm of the engine exceeds the level of from about 500 rpm to 800 rpm.

In the case of the circuit of FIG. 1, the effective level of the field current supplied to the field coil 102A of the AC generator 1A is reduced by controlling the duty factor of the power transistor 305 when the rpm of thereof increases. It is possible, however, to vary the voltage applied across the field coil 102A in response to the rpm of the AC generator 1A. Furthermore, in the case of the circuit of FIG. 1, the reduction of the effective field current level is commenced at about 1300 rpm. However, the reduction or the limitation of the effective field current may be commenced at a level selected from the range from 1000 rpm to 2000 rpm.

Furthermore, in the case of the circuit of FIG. 1, the voltage at point B is limited under a constant voltage $V_2$ when the rpm of the AC generator 1A exceeds 5000 rpm. However, if the resistance value of the resistor 904 is select at a small value, the voltage at point B continues to rise after the rotational speed of the AC generator 1A exceeds 5000 rpm and the diode 907 begins to conduct. Then, the duty factor is further reduced after the rpm of the AC generator 1A exceeds 5000 rpm. Since the maximum output current of the AC generator 1A increases a little even above 5000 rpm, a small reduction of the duty factor of the power transistor 305 maintains the maximum output current substantially at a constant level over 5000 rpm.

Figure 6:
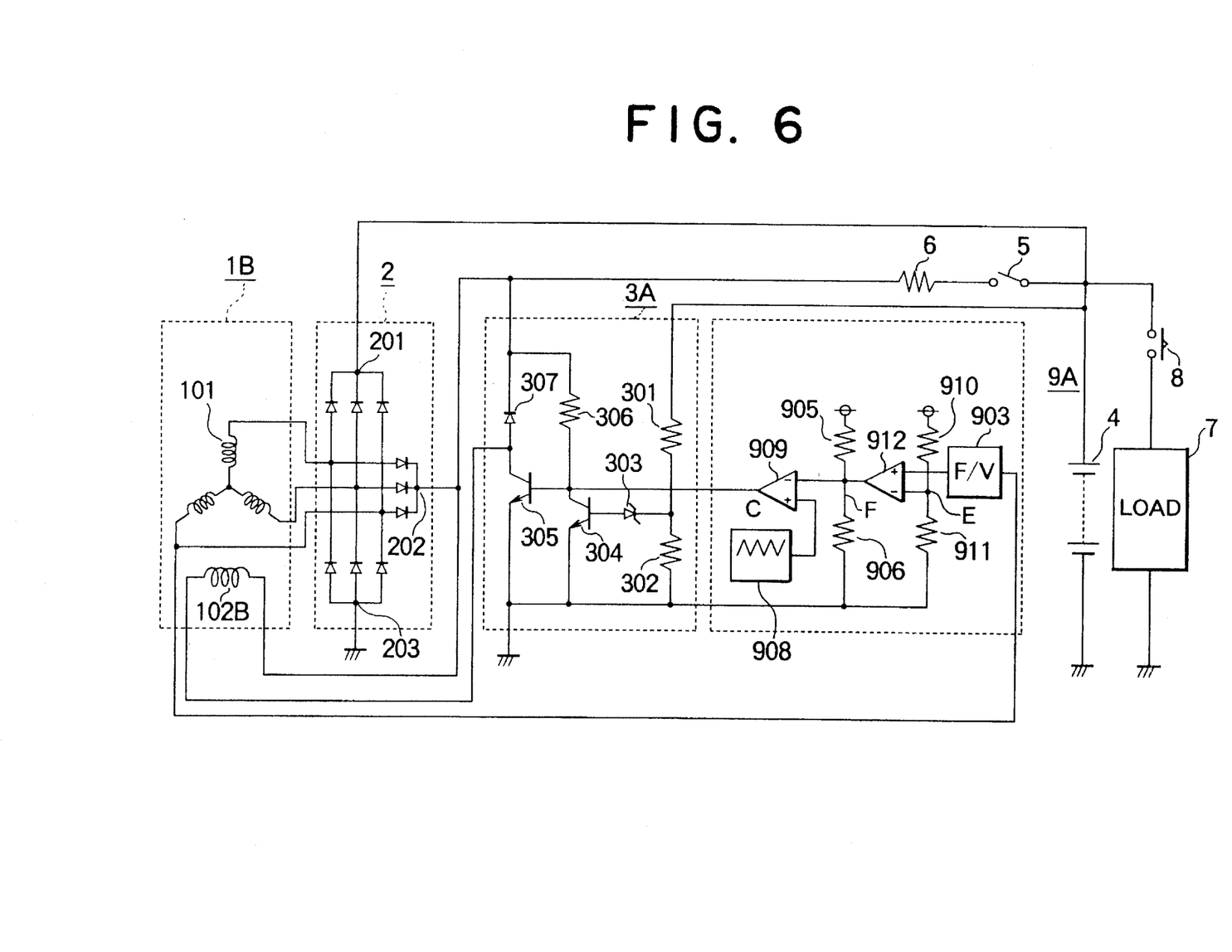
FIG. 6 is a circuit diagram showing another output power control device according to this invention.

FIG. 6 is a circuit diagram showing another output power control device according to this invention. The circuit of FIG. 6 is similar to that of FIG. 1 except for the following points.

Figure 8:
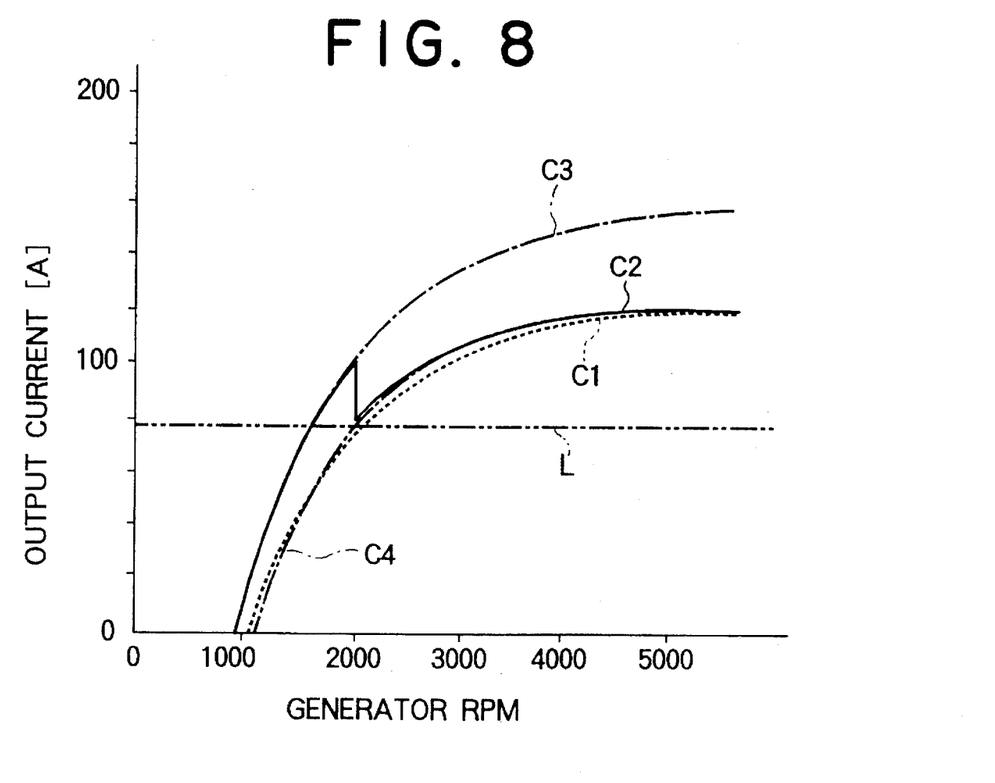
FIG. 8 shows the total load L of the vehicle, the maximum output current of the conventional AC generator (curve C1), the output current of the AC generator 1B of FIG. 6 as controlled by the output power control device according to this invention (curve C2), the maximum output current of the AC generator 1B of FIG. 6 (curve C3), and the output current of the AC generator 1B of FIG. 6 at a reduced duty factor (curve C4)

The dimensional parameters of the field coil 102B of the AC generator 1B are selected such that the field current is from about 1.2 to about 1.5 times the conventional field current level. Thus, as shown in FIG. 8, the maximum output current C3 of the AC generator 1B (i.e., the output current at the duty factor of 100 percent) is greater than the maximum output current C1 of the conventional AC generator. As in the case of the conventional circuit of FIG. 13, the full-wave rectifier 2 includes an auxiliary output terminal 202 and the three diodes associated therewith, the auxiliary output terminal 202 being coupled to the battery 4 through a resistor 6 and the key switch 5. The field coil 102A of the AC generator 1B is coupled in series with the power transistor 305 of the voltage regulator circuit 3A across the auxiliary output terminal 202 and the ground. The surge absorber diode 307 is coupled across the collector of the power transistor 305 and the auxiliary output terminal 202 of the full-wave rectifier 2.

The field current limiter circuit 9A includes resistors 905, 906, 910, 911 and first and second comparators 909 and 912, as well as a frequency-to-voltage converter 903 and a sawtooth waveform generator 908. The frequency-to-voltage converter 903 having an input terminal coupled to the armature coil 101 of the AC generator 1B outputs a voltage corresponding to the input frequency. The output of the frequency-to-voltage converter 903 is coupled to the (+)-input terminal of the first comparator 912. The (−)-input terminal of the comparator 912 is coupled to the junction point E between the resistors 910 and 911, which are coupled serially across a constant voltage source (not shown) and the ground to provide a reference voltage for the comparator 912 at the junction point E therebetween. The output of the comparator 912 is at the high level when the output voltage of the frequency-to-voltage converter 903 is higher than the reference voltage at point E, and at the low level when the output voltage of the frequency-to-voltage converter 903 is lower than the reference voltage at point E. Thus the output of the comparator 912 is at the high level when and only when the rpm of the AC generator 1B exceeds a predetermined level. The output of the comparator 912 is coupled directly to the (−)-input terminal of the second comparator 909. Further, the resistors 905 and the 906 are coupled serially across a constant voltage source (not shown) and the ground to provide a reference voltage at the junction point F therebetween. The junction point F between the resistors 905 and 906 is coupled to the (−)-input terminal of the second comparator 909. The (+)-input terminal of the comparator 909 is coupled to the output C of the sawtooth waveform generator 908.

The operation of the circuit of FIG. 6 is similar to that of the circuits of FIGS. 1 and 13 except for the operation of the field current limiter circuit 9A. Next, the operation of the field current limiter circuit 9A is described.

Figures 7A, 7B:
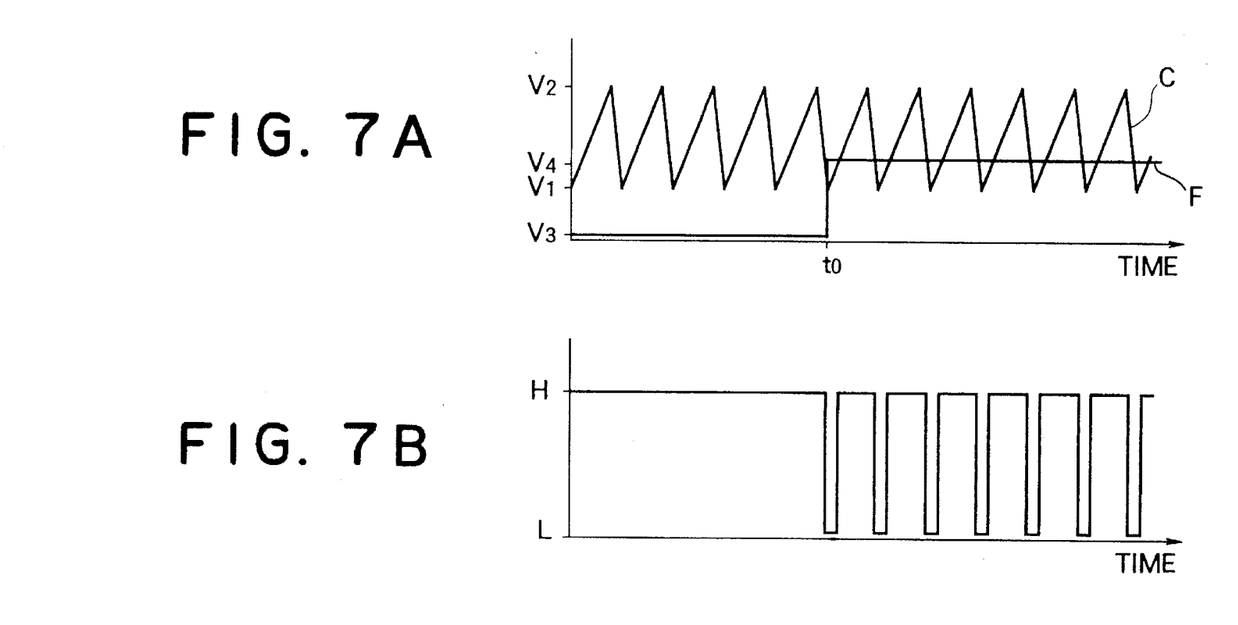
FIG. 7A shows the waveforms C and F input to the (+)- and (−)-input terminals, respectively, of the comparator 909 of FIG. 6.
FIG. 7B shows the waveform of the output of the comparator 909 of FIG. 6.
Figure 7C:
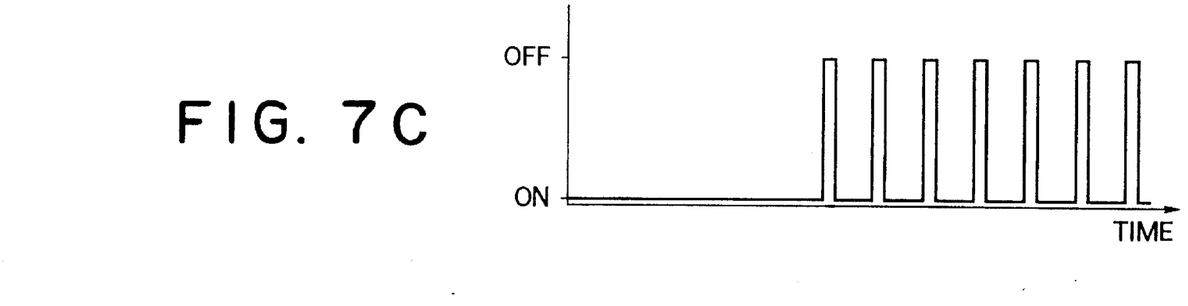
FIG. 7C shows the ON/OFF of the power transistor 305 of FIG. 6.

FIG. 7A shows the waveforms C and F input to the (+)- and (−)-input terminals, respectively, of the comparator 909 of FIG. 6. The sawtooth waveform C output from the sawtooth waveform generator 908 vibrates between the bottom level $V_1$ and the peak level $V_2$. The output of the comparator 912 and hence the voltage F input to the (−)-input terminal of the comparator 909 remain at the low level until the time point to up to which time the rpm of the AC generator 1B does not exceed a predetermined level of about 2000 rpm. Thus the voltage F at the input to the (−)-input terminal of the comparator 909 is at a level $V_3$ lower than the bottom voltage $V_1$ of the sawtooth waveform C input to the (+)-input terminal of the comparator 909. Thus, as shown in FIG. ? B, the output of the comparator 909 is retained at the high level H until the time point $t_0$, and hence the power transistor 305 is kept turned on as shown in FIG. 7C, provided that the Zener diode 303 and the control transistor 304 are turned off. Namely, the duty factor of the power transistor 305 is kept at 100 percent when the rpm of the AC generator 1B is below the predetermined level of about 2000 rpm.

On the other hand, when the rotational speed of the AC generator 1B exceeds the predetermined level of about 2000 rpm, the voltage F input to the (−)-input terminal of the comparator 909 rises to a level $V_4$ higher than the bottom voltage level $V_1$ of the sawtooth waveform input to the (+)-input terminal of the comparator 909 (see FIG. 7A). Thus, the comparator 909 outputs a pulse train whose frequency is equal to twice the frequency of the sawtooth waveform C and whose duty factor is equal to the ratio of $V_2-V_4$ to $V_2-V_1$. The power transistor 305 is repeatedly turned on and off accordingly (see FIG. 7C).

Figure 9:
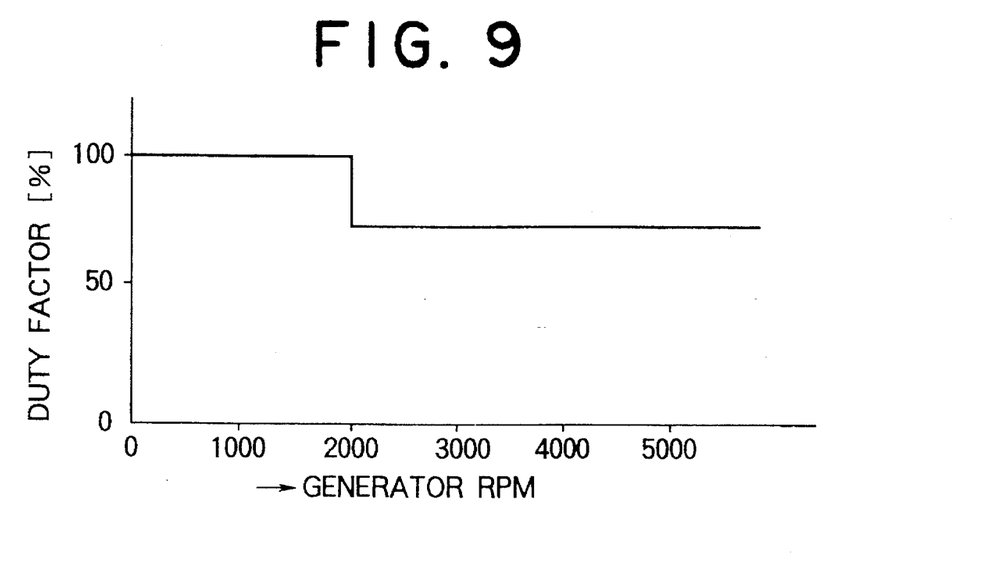
FIG. 9 shows the duty factor of the power transistor 305 of FIG. 6 with respect to the rpm of the AC generator 1B.

Thus, as shown in FIG. 9, above about 2000 rpm, the duty factor of the power transistor 305 is reduced from 100 percent to a predetermined level determined by the voltage level $V_4$ relative to the bottom and the peak voltage levels $V_1$ and $V_2$ of the sawtooth waveform. (The voltage level $V_4$ can be adjusted easily by an appropriate selection of the resistance values of the resistors 905 and 906.) As a result, as shown in FIG. 8, the actual output current C2 of the AC generator 1B drops from the maximum output current level C3 to the reduced output level C4 generated at the reduced duty factor The level of the reduced output current C2 at the predetermined rotational speed 2000 rpm, however, is above the total electric load L of the vehicle.

In the case of this embodiment, it is assumed that the rotational speed of the AC generator 1B is from about 1500 to 1800 rpm when the engine is idling. It is noted that in this idling rpm range of the AC generator 1B, the maximum output current C3 is above the total load L of the vehicle. Further, the level of the reduced output current C2 at the predetermined rotational speed 2000 rpm is above the total electric load L of the vehicle. Thus, the circuit of FIG. 6 provides an advantage similar to that provided by the circuit of FIG. 1. Namely, at the low or idling rpm range below the predetermined rotational speed of 2000 rpm, the field coil 102B is supplied with the maximum effective field current such that the AC generator 1B generates the maximum output current which exceeds the load L of the vehicle. On the other hand, over the middle to the high rotational speed range above the predetermined rotational speed, the level of the effective field current supplied to the field coil 102B is reduced by a predetermined factor. Thus, the generation of unnecessary current is prevented and the energy conversion efficiency is improved. Further, an abnormal rise of the temperature of the AC generator 1B due to the generation of heat is prevented.

Figure 10:
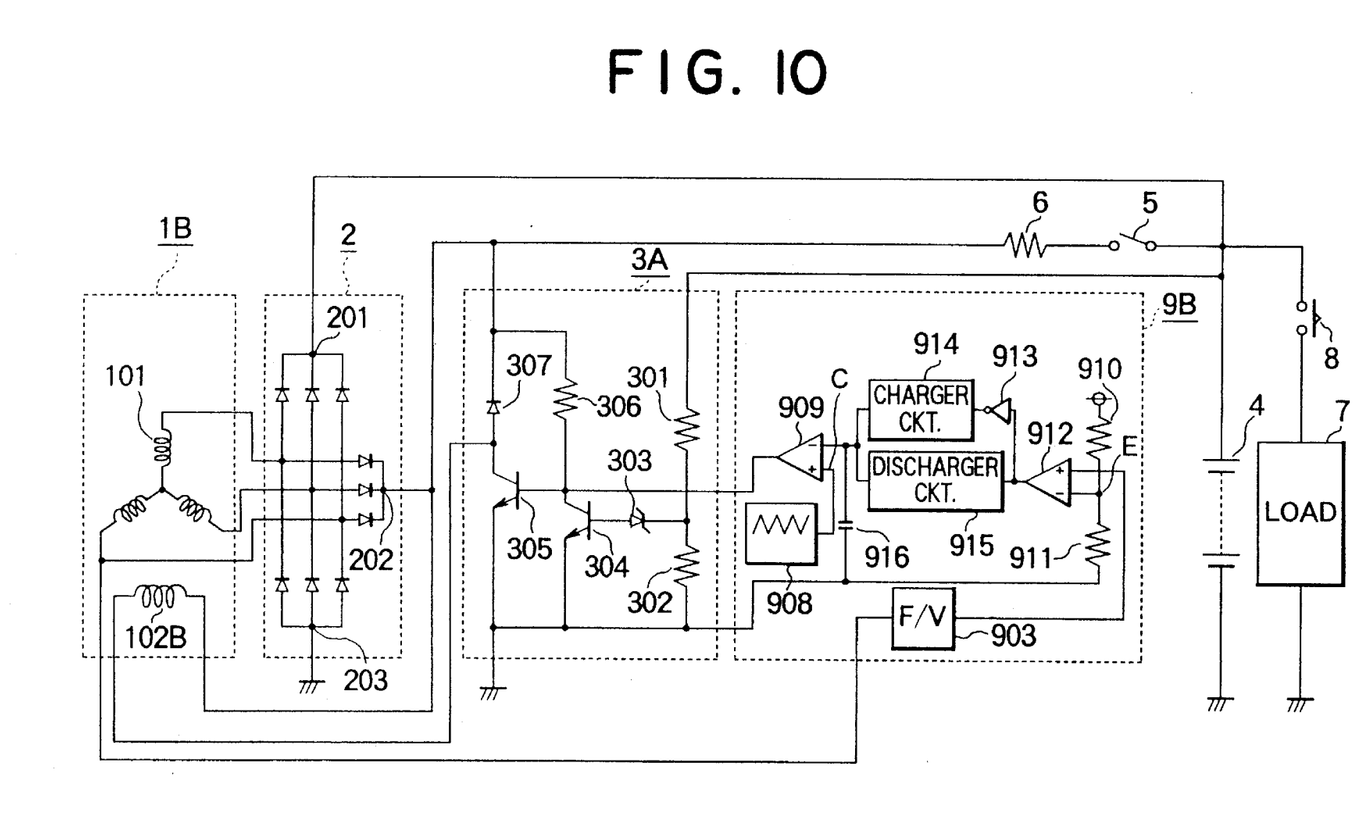
FIG. 10 is a circuit diagram showing still another output power control device for an automotive AC generator according to this invention.

FIG. 10 is a circuit diagram showing still another output power control device for an automotive AC generator according to this invention. The circuit of FIG. 10 is similar to that of FIG. 6 except for the structure of the field current limiter circuit 9B. Namely, the output of the comparator 912 is coupled to the (−)-input terminal of the comparator 909 via a circuit consisting of: an inverter 913 coupled to the output of the comparator 912; a constant charging current source 914 having a control input coupled to the output of the inverter 913; a constant discharging current source 915 having a control input coupled to the output of the comparator 912; and a capacitor 916 coupled across the (−)-input terminal of the comparator 909 and the ground. The terminals of the constant charging current source 914 and the constant discharging current source 915 are coupled to the point G between the capacitor 916 and the (−)-input terminal of the comparator 909.

Upon receiving a low level signal at the control terminal thereof, the constant charging current source 914 charges the capacitor 916 with a constant current until the voltage across the capacitor 916 reaches a predetermined voltage level $V_6$.

On the other hand, the constant discharging current source 915 discharges the capacitor 916 with a constant current until the voltage across the capacitor 916 falls to a predetermined voltage level $V_5$ upon receiving a low level signal at the control terminal thereof.

Assume first that the rpm of the AC generator 1B exceeds the predetermined rotational speed of 2000 rpm at the time point $t_1$, to raise the output of the comparator 912 from the low to the high level. Then, the output of the inverter 913 falls to the low level to trigger the operation of the constant charging current source 914. As a result, the constant charging current source 914 begins to charge the capacitor 916 with a constant current, and the voltage at point G input to the (−)-input terminal of the comparator 909 rises gradually from the level $V_5$ to the predetermined voltage $V_6$ (see curve G of FIG. 11A). The rise rate and the rise time of the voltage at point G is determined by the capacity of the capacitor 916 and the level of the constant charging current provided by the constant charging current source 914.

Now assume that the rpm of the AC generator 1B which has been above the predetermined rotational speed of 2000 rpm falls thereunder at the time point $t_2$. The output of the comparator 912 falls from the high to the low level, and thereby triggers the constant discharging current source 915. As a result, the the constant discharging current source 915 begins to discharge the capacitor 916 with a constant current, and the voltage at point G input to the (−)-input terminal of the comparator 909 falls gradually from the predetermined level $V_6$ to the predetermined voltage $V_5$ (see curve G of FIG. 11A). The fall rate and time of the voltage at point G is also determined by the capacity of the capacitor 916 and the level of the constant discharging current drawn out by the constant charging current source 914.

Figure 11A:
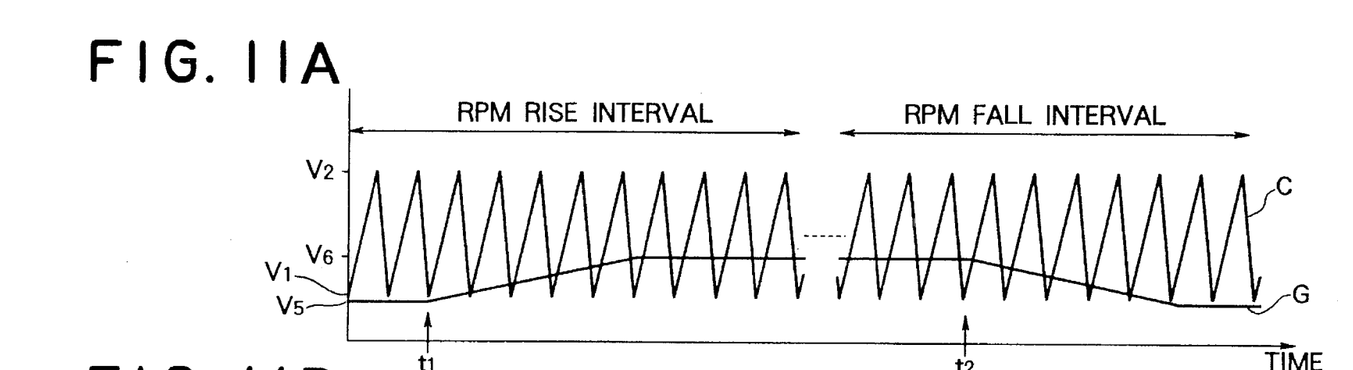
FIG. 11A shows the waveforms of the inputs to the (+)- and (−)-input terminals of the comparator 909 of FIG. 10.
Figure 11B:
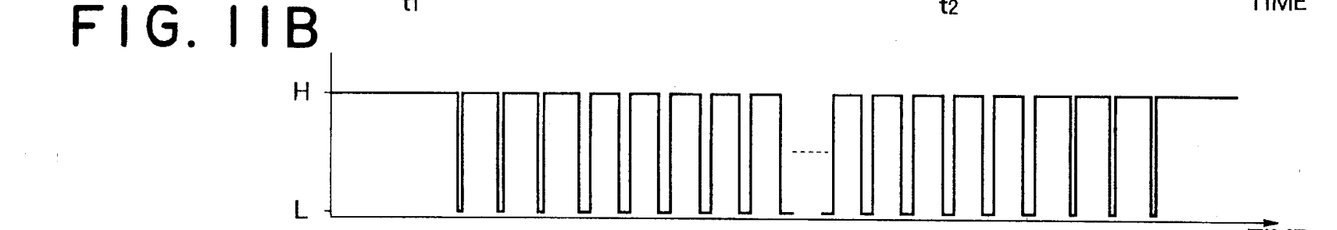
FIG. 11B shows the waveform of the output of the comparator 909 of FIG. 10.
Figure 11C:
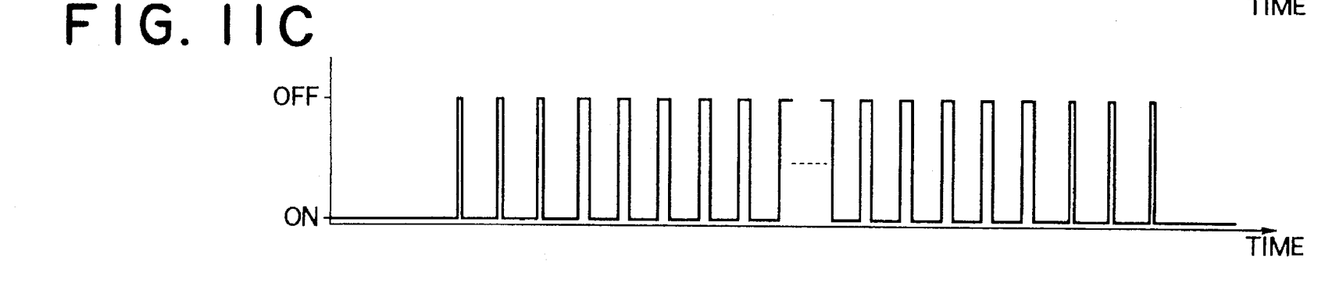
FIG. 11C shows the ON/OFF of the power transistor 305 of FIG. 10.

As shown in FIG. 11A, the voltage level $V_5$ is set smaller than the bottom level of the sawtooth waveform C output from the sawtooth waveform generator 908. Thus, when the voltage at point G is at the low level $V_5$, the output of the comparator 909 is retained at the high level H as shown in FIG. 11B. After the rpm of the AC generator 1B exceeds the predetermined rotational speed and the constant charging current source 914 begins to charge the capacitor 916, the voltage G rises above the bottom level $V_1$ of the sawtooth waveform C, such that the comparator 909 begins to produce a pulse train at a predetermined frequency. As shown in FIG. 11B, the duty factor of the pulse train decreases as the voltage G rises. The duty factor of the power transistor 305 is controlled accordingly, as shown in FIG. 11C. The duty factor of the pulse train of the comparator 909 during the time when the voltage G is at the predetermined high level $V_6$ is determined by the ratio of $V_2-V_6$ to $V_2-V_1$.

After the rpm of the AC generator 1B falls below the predetermined rotational speed at time point $t_2$, the voltage G falls from the high level $V_6$ to the low level $V_5$ at the same predetermined rate as the rising rate. Thus, the duty factor of the pulse train output from the comparator 909 increases gradually from the predetermined reduced level to 100 percent (see FIG. 11B). Accordingly, the duty factor of the power transistor 305 is returned to 100 percent (see FIG. 11C).

Figure 12:
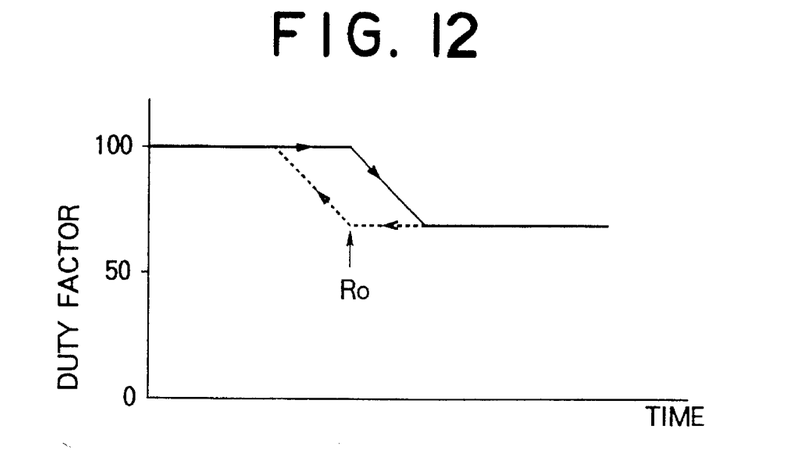
FIG. 12 is a conceptual diagram showing the variation of the duty factor of the power transistor 305 of FIG. 10.

FIG. 12 is a conceptual diagram showing the variation of the duty factor of the power transistor 305 of FIG. 10. In FIG. 12, the solid curve shows the variation of the duty factor in the case where the rpm of the AC generator 1B is increasing. The time proceeds forward from left to right, and the duty factor falls from 100 percent to the predetermined reduced level when the rpm of the AC generator 1B reaches the predetermined rotational speed $R_0$ from below. On the other hand, the dotted curve shows the variation of the duty factor in the case where the rpm of the AC generator 1B is decreasing. Then the time proceeds backward from right to left, and the duty factor rises from the predetermined reduced level to 100 percent when the rpm of the AC generator 1B reaches the predetermined rotational speed $R_0$ from above.

The duty factor of the power transistor 305 rises and falls at a predetermined rate and over a predetermined length of time interval, beginning at the detection time point of the predetermined rotational speed $R_0$. The output current of the AC generator 1B thus changes gradually when the rotational speed of the AC generator 1B crosses from above or below the predetermined rpm $R_0$. Since the torque required to drive the AC generator 1B changes with the output current level of the AC generator 1B, abrupt change of the output current level brings about a shock upon the engine. The gradual change of the duty factor by means of the constant charging current source 914, the constant discharging current source 915 and the capacitor 916 is effective in reducing this shock.

What is claimed is:

1. An output power control device for an automotive AC generator including a field coil, said output power control device comprising:

switching means coupled in series with said field coil of said automotive AC generator for controlling a current supplied to said field coil;

rotational speed detector means for detecting a value corresponding to a rotational speed of said automotive AC generator; and field current control means, coupled to said rotational speed detector means and said switching means, for reducing an effective level of said current supplied to said field coil when said rotational speed of said automotive AC generator exceeds a first predetermined rotational speed level;

wherein a current output by said automotive AC generator exceeds a total electric load of a vehicle associated with said automotive AC generator when a rotational speed of said automotive AC generator is above a second predetermined rotational speed level lower than said first predetermined rotational speed level.

2. An output power control device as claimed in claim 1, wherein said field current control means controls a duty factor of said switching means to reduce said effective level of said current supplied to said field coil when said rotational speed of said automotive AC generator exceeds said first predetermined rotational speed level.

3. An output power control device as claimed in claim 2, wherein said field current control means comprises:

converter means, coupled to said rotational speed detector means, for converting a level corresponding to said rotational speed of said automotive AC generator to a voltage corresponding thereto; and pulse width modulation means, coupled to said converter means, for generating a pulse signal of a varying duty factor, wherein said duty factor of said pulse signal is reduced when said rotational speed of said automotive AC generator exceeds said first predetermined rotational speed level;

wherein an ON/OFF of said switching means is controlled by said pulse signal output from said pulse width modulation means to reduce said effective level of said current supplied to said field coil when said rotational speed of said automotive AC generator exceeds said first predetermined rotational speed level.

4. An output power control device as claimed in claim 3, wherein said pulse width modulation means comprises:

sawtooth waveform generator for generating and outputting a sawtooth waveform signal of a predetermined frequency;

a comparator having a first input terminal coupled to an output of said converter means, and a second input terminal coupled to an output of said sawtooth waveform generator, wherein said comparator compares said sawtooth waveform with said output of said converter means to generate said pulse signal of varying duty factor.

5. An output power control device as claimed in claim 4, wherein said pulse width modulation means further comprises:

voltage limiter means for limiting said output of said converter means under a predetermined level.

6. An output power control device as claimed in claim 5, wherein said voltage limiter comprises:

a voltage divider being made up of two resistors in a series arrangement and providing a predetermined constant voltage at a junction point between said resistors; and a serial connection of a resistor and a diode coupled across said output of said converter means and said junction point between said resistors of said voltage divider.

7. An output power control device as claimed in claim 1, wherein a rotational speed range between said first and said predetermined rotational speeds includes a range corresponding to an idling rotational speed of said engine associated with said automotive AC generator.

8. An output power control device as claimed in claim 1, wherein said switching means comprises a semiconductor switching element.

9. An output power control device as claimed in claim 1, further comprising:

voltage regulator circuit means, coupled to an output of said automotive AC generator, for controlling an ON/OFF of said switching means in response to an output voltage level of said automotive AC generator.

10. An output power control device as claimed in claim 3, wherein said pulse width modulation means comprises:

a voltage divider providing a predetermined constant voltage at a junction point therebetween;

first comparator means having a first input coupled to said junction point of said voltage divider, and a second input coupled to an output of said converter means, said first comparator means generating and outputting a signal at a first and a second level, respectively, according as said output of said converter means is above and below said predetermined constant voltage provided by said voltage divider;

sawtooth waveform generator for generating and outputting a sawtooth waveform signal of a predetermined frequency; and second comparator means having a first input coupled to an output of said first comparator, and a second input coupled an output of said sawtooth waveform generator means, wherein said second comparator compares said sawtooth waveform with said output of said first comparator to generate said pulse signal of varying duty factor.

11. An output power control device as claimed in claim 10, further comprising:

voltage change rate moderation means, having an input coupled to said output of said first comparator, and an output coupled to said first input of said second comparator, wherein said voltage change rate moderation means moderates a change rate of said signal output from said converter means and applies a moderated signal to said first input of said second comparator means.

12. An output power control device as claimed in claim 11, wherein said voltage change rate moderation means comprises:

a capacitor coupled across said first input of said second comparator means and a constant voltage level;

constant charging current source means, having a control input coupled to said output of said converter means, for charging said capacitor with a constant current when said output of said converter means changes from a first to a second level; and constant discharging current source means, having a control input coupled to said output of said converter means, for discharging said capacitor with a constant current when said output of said converter means changes from said second to said first level.

* * * * *